(12) United States Patent
Urakawa

(10) Patent No.: US 11,533,411 B2
(45) Date of Patent: Dec. 20, 2022

(54) IMAGE FORMING SYSTEM AND IMAGE FORMING APPARATUS CONFIGURED TO DETERMINE WHETHER TO EXECUTE REMOTE DISPLAY CONTROL

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/475,785

(22) Filed: Sep. 15, 2021

(65) Prior Publication Data

US 2022/0124215 A1 Apr. 21, 2022

(30) Foreign Application Priority Data

Oct. 16, 2020 (JP) .............................. JP2020-174946

(51) Int. Cl.
*H04N 1/00* (2006.01)
(52) U.S. Cl.
CPC ..... *H04N 1/00973* (2013.01); *H04N 1/00408* (2013.01)
(58) Field of Classification Search
CPC ........... H04N 1/00973; H04N 1/00408; H04N 2201/0075
See application file for complete search history.

(56) References Cited

U.S. PATENT DOCUMENTS

| | | | |
|---|---|---|---|
| 2016/0286076 A1* | 9/2016 | Kuribara | H04N 1/00344 |
| 2017/0064121 A1* | 3/2017 | Matsuda | H04N 1/00973 |
| 2018/0191917 A1* | 7/2018 | Kawamura | H04N 1/00129 |
| 2020/0319830 A1* | 10/2020 | Kaneda | G06F 3/1285 |
| 2021/0042071 A1* | 2/2021 | Sako | G06F 3/1204 |

FOREIGN PATENT DOCUMENTS

JP  2020-10265 A  1/2020

\* cited by examiner

*Primary Examiner* — Iriana Cruz
(74) *Attorney, Agent, or Firm* — Scully, Scott, Murphy & Presser, PC

(57) ABSTRACT

A first controller of an image forming apparatus executes a remote display control. The remote display control is control of, in response to receiving a start request from one of a plurality of information processing apparatuses, controlling a requesting information processing apparatus to display a remote screen. A second controller of the requesting information processing apparatus displays the remote screen in accordance with the remote display control by the first controller. A determination controller determines whether the remote display control is currently executed by a previous request. The first controller is configured to: in response to determining that the remote display control is not currently executed by the previous request, execute the remote display control for the requesting information processing apparatus; and in response to determining that the remote display control is currently executed by the previous request, not execute the remote display control for the requesting information processing apparatus.

18 Claims, 7 Drawing Sheets

IMAGE FORMING SYSTEM AND IMAGE FORMING APPARATUS CONFIGURED TO DETERMINE WHETHER TO EXECUTE REMOTE DISPLAY CONTROL

CROSS REFERENCE TO RELATED APPLICATIONS

This application claims priority from Japanese Patent Application No. 2020-174946 filed Oct. 16, 2020. The entire content of the priority application is incorporated herein by reference.

BACKGROUND

An image forming system including an image forming apparatus and an information processing apparatus is known. In the image forming system, a screen displayed on a user interface of the image forming apparatus is displayed on the remote information processing apparatus.

SUMMARY

According to one aspect, this specification discloses an image forming system. The image forming system includes an image forming apparatus and a plurality of information processing apparatuses. A first controller of the image forming apparatus is configured to execute a remote display control. The remote display control is control of, in response to receiving a start request from one of the plurality of information processing apparatuses, controlling a requesting information processing apparatus to display a remote screen. The requesting information processing apparatus is the one of the plurality of information processing apparatuses that has transmitted the start request. The remote screen is a screen corresponding to an operation screen displayed on a user interface of the image forming apparatus. The requesting information processing apparatus includes a second controller. The second controller is configured to display the remote screen in accordance with the remote display control by the first controller. The first controller or the second controller serves as a determination controller. The determination controller is configured to determine whether the remote display control is currently executed by a previous request in response to receiving the start request from the requesting information processing apparatus. The previous request is a request transmitted from another one of the plurality of information processing apparatuses. The previous request is a request for the remote display control to the image forming apparatus. The previous request is a request transmitted before the start request is transmitted by the requesting information processing apparatus. The first controller is configured to: in response to determining that the remote display control is not currently executed by the previous request, execute the remote display control for the requesting information processing apparatus; and in response to determining that the remote display control is currently executed by the previous request, not execute the remote display control for the requesting information processing apparatus.

According to another aspect, this specification also discloses an image forming apparatus. The image forming apparatus includes a user interface and a controller. The controller is configured to: in response to receiving a start request for a remote display control from one of a plurality of information processing apparatuses, determine whether the remote display control is currently executed by a previous request, the remote display control being control of controlling a requesting information processing apparatus to display a remote screen, the requesting information processing apparatus being the one of the plurality of information processing apparatuses that has transmitted the start request, the remote screen being a screen corresponding to an operation screen displayed on the user interface, the previous request being a request transmitted from another one of the plurality of information processing apparatuses, the previous request being a request for the remote display control to the image forming apparatus, the previous request being a request transmitted before the start request is transmitted by the requesting information processing apparatus; in response to determining that the remote display control is not currently executed by the previous request, execute the remote display control for the requesting information processing apparatus; and in response to determining that the remote display control is currently executed by the previous request, not execute the remote display control for the requesting information processing apparatus.

With the above configuration, when the remote display control is executed by one of the plurality of information processing apparatuses, even if a start request for remote display control is made by another information processing apparatus, the controller of the image forming apparatus does not execute the remote display control for the information processing apparatus that made the start request. This prevents the image forming apparatus from executing remote display control for multiple information processing apparatuses, and prevents adverse effects on the operation of the image forming apparatus.

BRIEF DESCRIPTION OF THE DRAWINGS

Embodiments in accordance with this disclosure will be described in detail with reference to the following figures wherein.

DETAILED DESCRIPTION

In a situation where an image forming apparatus can access a plurality of information processing apparatuses, if the user interface of the image forming apparatus is remotely operated from the plurality of apparatuses, there may be adverse effects on the operation of the image forming apparatus.

In view of the foregoing, an aspect of an objective of this disclosure is to suppress adverse effects on the operation of the image forming apparatus even when the user interface of the image forming apparatus is remotely displayed in a situation where a plurality of information processing apparatuses can access the image forming apparatus.

Figure 1:
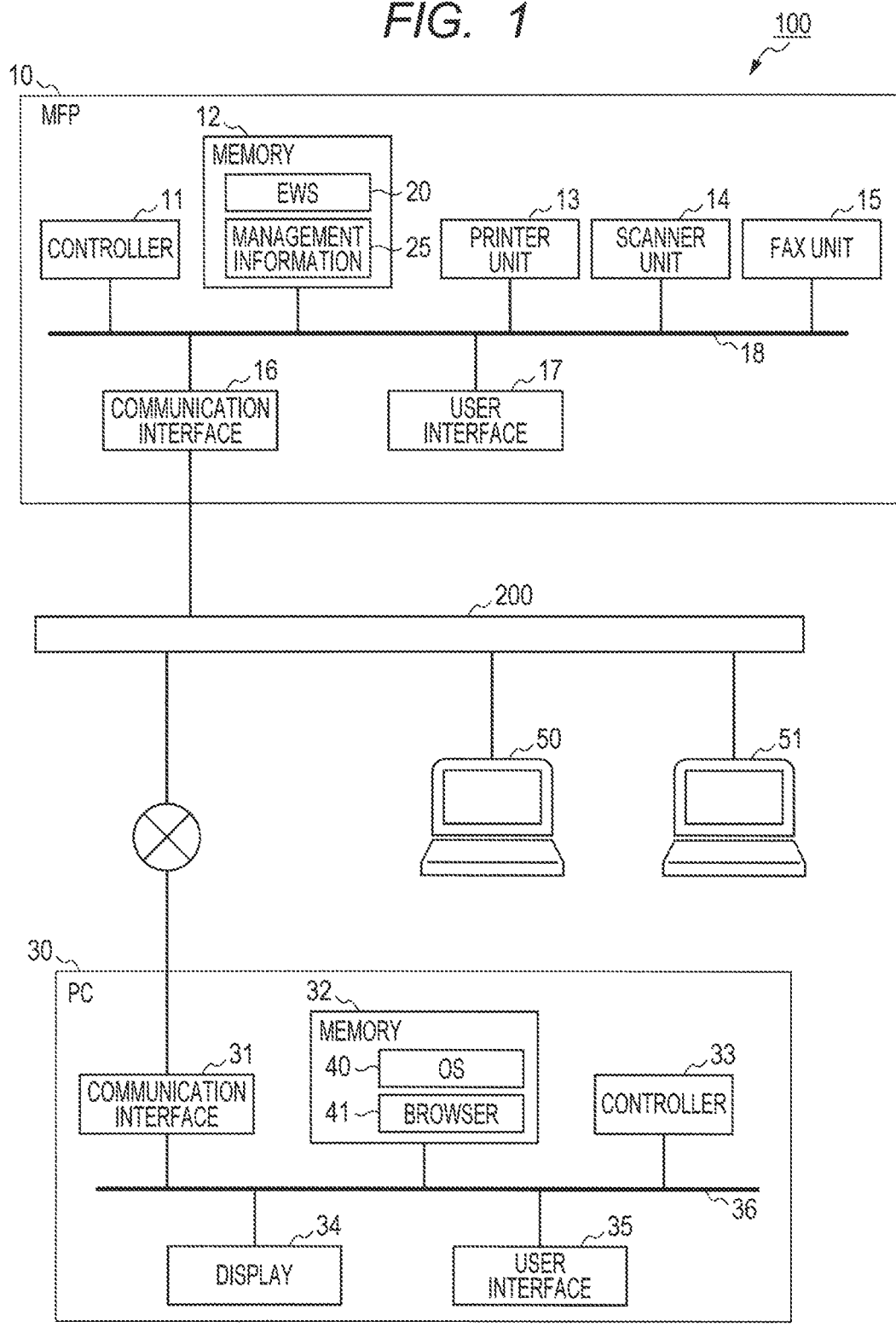
FIG. 1 is a diagram showing the configuration of an image forming system.

An image forming system 100 according to an embodiment will be described with reference to the drawings. The image forming system 100 shown in FIG. 1 includes an MFP 10 and PCs 30, 50, and 51. The MFP is an abbreviation for multifunction peripheral. The MFP 10 and the PCs 30, 50, and 51 are connected to a network 200 and communicate with each other through the network 200. The network 200 is a LAN or the Internet. In this embodiment, the MFP 100 is an example of an image forming apparatus. The PCs 30, 50, and 51 are examples of an information processing apparatus.

Next, the configuration of the MFP 10 will be described. The MFP 100 includes a controller 11, a memory 12, a printer unit 13, a scanner unit 14, a FAX unit 15, a communication interface 16, a user interface 17, and a bus 18. The "interface" may be abbreviated as "IF".

The communication interface 16 connects the MFP 10 to the network 200 in accordance with a particular communication protocol. The user interface 17 is an interface that exists between a user who directly operates the MFP 10 and the controller 11, and has, for example, a touch panel and an operation key which is a physical key.

The printer unit 13 executes a print operation of printing an image on a recording medium such as a sheet or a disk. As the recording method of the printer unit 13, an inkjet method, an electrophotographic method, and so on may be adopted. The scanner unit 14 executes a scan operation of reading an image recorded on a document and generating image data. The FAX unit 15 executes a FAX operation of transmitting and receiving image data in a method in accordance with the FAX protocol. The MFP 10 may be configured to execute a combined operation in which a plurality of operations are combined. A copy operation that combines the print operation by the printer unit 13 and the scan operation by the scanner unit 14 is an example of the combined operation.

The controller 11 includes a CPU, an ASIC (abbreviation of Application Specific Integrated Circuit), and so on, and controls the operations of the printer unit 13, the scanner unit 14, the FAX unit 15, the communication interface 16, and the user interface 17. The memory 12 includes a data storage area. The data storage area is an area for storing data and so on necessary for executing a program and so on. The memory 12 is configured by combining a RAM, a ROM, an SSD, an HDD, and so on. A buffer included in the controller 11 and used when executing various programs may also be regarded as a part of the memory 12. The memory 12 may be a storage medium that is readable by the controller 11. The storage medium that is readable by the controller 11 is a non-transitory medium. In addition to the above examples, the non-transitory medium also includes a recording medium such as a CD-ROM or a DVD-ROM. The non-transitory medium is also a tangible medium. On the other hand, an electric signal that carries a program downloaded from a server on the Internet and so on is a computer-readable signal medium, which is a kind of computer-readable medium, but is not included in a non-transitory computer-readable storage medium.

The memory 12 stores a control program and an EWS (abbreviation for Embedded Web server) program 20 as programs that are executed by the controller 11. In the following description, the controller 11 that executes a program may be simply described by the program name. For example, the description "EWS" is used to mean "the controller 11 that executes the EWS program 20". In this embodiment, the processes of the controller 11 according to instructions described in the program is mainly shown. That is, the processes such as "judgment", "extraction", "selection", "calculation", "determination", "identifying", "acquisition", "acceptance", and "control" in the following description are the processes of the controller 11. Note that "acquisition" is used as a concept that does not require a request. That is, the process of receiving data without request by the controller 11 is also included in the concept of "the controller 11 acquires data". The "data" in the present specification is represented by a bit array that is readable by the controller. Further, data having the same substantial meaning and contents but different formats are treated as the same data. The same goes for "information" in the present specification.

Management information 25 is stored in the data storage area of the memory 12. In the management information 25, a login name and a password, which are authentication information, are stored in association with a PC that can access the MFP 10.

Next, the configuration of the PC 30 will be described. The PC 30 includes a communication interface 31, a memory 32, a controller 33, a display 34, and a user interface 35. The communication interface 31, the memory 32, the controller 33, and the user interface 35 included in the PC 30 have similar configurations to the controller 11, the memory 12, the communication interface 16 and the user interface 17 included in the MFP 30, and the description thereof will be omitted.

An OS 40 and a browser 41 are stored in the memory 32. The browser 41 is a program that causes the controller 33 to display, on the display 34, an image corresponding to Web page data transmitted from the EWS 20. The PCs 50 and 51 have similar configuration to the PC 30, and the description thereof will be omitted.

Next, the steps of the process executed between the MFP 10 and the PC 30 will be described with reference to FIGS. 2 and 3.

Figure 11:
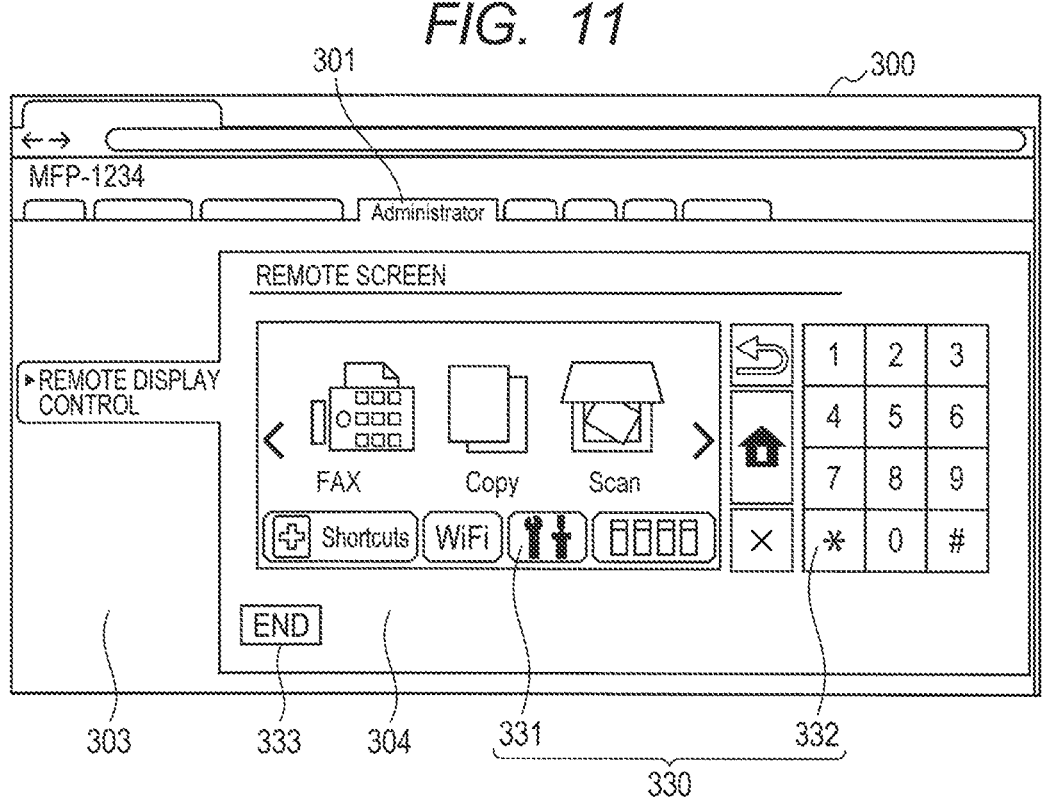
FIG. 11 is a diagram for illustrating a remote screen.

In step 10 (hereinafter simply referred to as S10) in FIG. 2, the MFP 10 displays an operation screen on the user interface 17, and changes display on the operation screen sequentially in response to an operation through the user interface 17, the operation of the MFP 10, and so on. A process of changing the operation screen sequentially is performed in parallel with the processes in FIG. 2. The operation screen includes an under-execution screen indicating that a process such as printing or scanning is being performed, an instruction screen for accepting an instruction for execution of copying, scanning, and so on, a setting screen for changing various types of setting, a status screen indicating the status of the MFP 10, an execution instruction screen, and a standby screen for waiting an instruction for displaying the setting screen, for example. FIG. 11 shows an example of a standby screen displayed in a remote screen described later in a state where a standby screen is displayed on the user interface 17. The MFP 10 is notified of information indicating various operations performed through the user interface 35 on a display screen displayed in the remote screen. As in a case when an operation screen displayed on the user interface 17 is operated, the MFP 10 having received the information indicating an operation performs a process responsive to the operation. For example, if information indicating an operation on a Copy button is received, the MFP 10 performs a copying process including display of a copying under-execution screen. If information indicating an operation on a setting button is received, for example, the MFP 10 performs a process for setting a parameter for the MFP 10 including display of a setting screen.

If a remote screen of the MFP 10 is concurrently displayed at the PC 30 and at a PC 30' different from the PC 30, an adverse effect may be caused on the operation of the MFP 10. For example, the users of the PCs 30 and 30' may be confused because the MFP 10 performs a process under an influence by an operation performed by a user other than the operation performed by the user himself or herself. More specifically, if the user of the PC 30' operates a setting button in a remote screen at the PC 30' immediately before the user of the PC 30 is about to operate a setting button in its remote screen, a setting screen is displayed in both of the remote screens at the PC 30 and at the PC 30' and the operation by the user of the PC 30' is accepted as an operation performed on the setting screen. This causes a concern that the MFP 10 will perform a process not expected both by the user of the PC 30 and by the user of the PC 30'.

In S11, the browser 41 of the PC 30 transmits a request for EWS screen data to the MFP 10. The EWS screen data is Web page data used for displaying a home screen of an EWS screen. If a user's input of a URL designating the EWS 20 is accepted, for example, the browser 41 transmits the request to the EWS 20. The browser 41 and the EWS 20 communicate with each other by following an http(s) protocol.

In S12, the EWS 20 transmits the EWS screen data to the PC 30. In S13, in response to receipt of the EWS screen data, the browser 41 causes the display 34 to display a home screen of an EWS screen indicated by the received EWS screen data.

Figure 4:
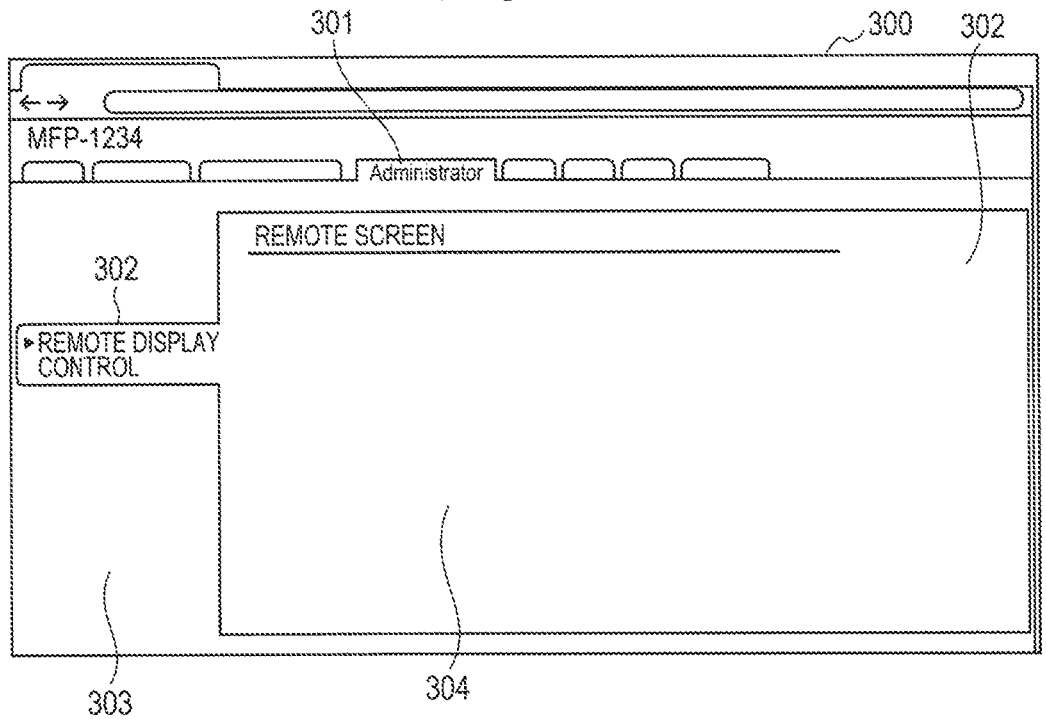
FIG. 4 is a diagram for illustrating an EWS screen.

When an operation for logging in to the EWS is performed on the home screen of an EWS screen 300, the browser 41 transmits a login password, and so on, to the EWS 20. When a response indicating permission for the login is acquired from the EWS, the browser 41 causes the display 34 of the PC 30 to display an administrator screen 302 shown in FIG. 4. The administrator screen 302 includes an item display area 303 and a function display area 304.

If an operation for selecting "remote display control" included in the item display area 303 is accepted through the user interface 35 in S14, the browser 41 transmits a start request for remote display control to the EWS 20 in S15. In response to receipt of the start request for remote display control, the EWS 20 transmits EWS screen data for updating the EWS screen 300 in S16. This EWS screen data includes a determination program interpretable by the browser 41 and an execution program. The determination program and the execution program are script programs in JavaScript, for example. In S17, the browser 41 performs a determination process according to the determination program. The controller 33 that performs the determination process is an example of a determination controller. Processes from S17 to S34 described later are performed by causing the browser 41 to interpret the determination program.

Figure 5:
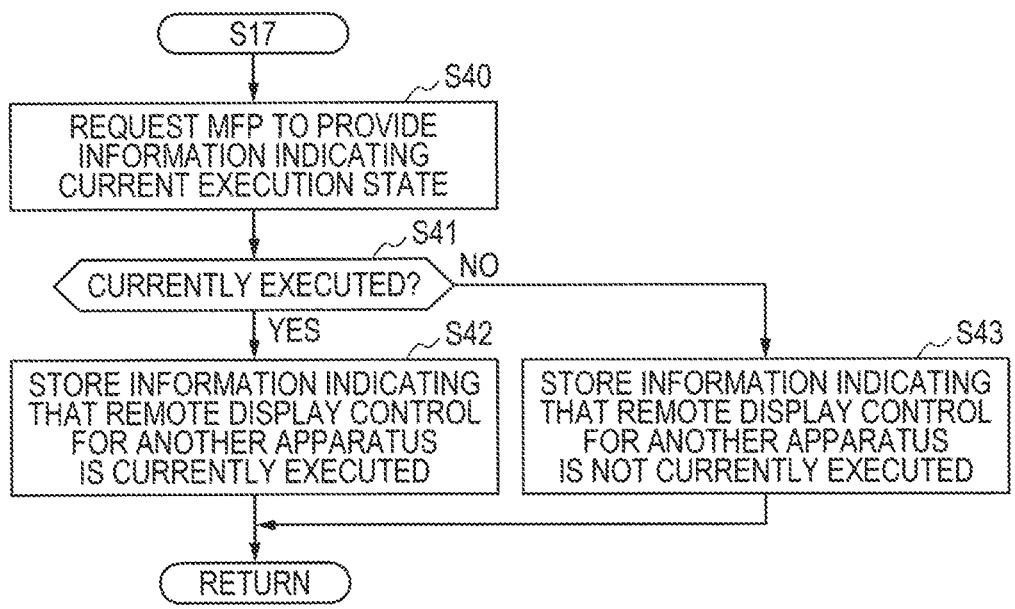
FIG. 5 is a flowchart for explaining a procedure of processing executed in S17 of FIG. 2.

FIG. 5 shows a procedure for the determination process performed in S17. In S40, the browser 41 requests the MFP 10 to provide information indicating a current execution state of remote display control. The information indicating an execution state of remote display control is information indicating whether remote display control for another apparatus is currently executed due to a start request made previously. In the present embodiment, this information indicates whether "currently executed" or "not executed." If the memory 12 stores information indicating a permitted state, the EWS 20 sends information indicating "currently executed" as a response. If not, the EWS 20 sends information indicating "not executed" as a response. The information indicating a permitted state will be described by referring to FIG. 3.

In S41, the browser 41 determines whether the information indicating an execution state transmitted as a response from the EWS 20 shows a status of "currently executed" or "not executed." In response to determining in S41 that the information indicating the execution state of remote display control shows "currently executed," the browser 41 proceeds to S42 in which an execution state determination flag is set at a value indicating that remote display control for another apparatus is currently executed. In response to determining in S41 that the information indicating the execution state of remote display control shows "not executed," the browser 41 proceeds to S43 in which the execution state determination flag is set at a value indicating that remote display control for another apparatus is not currently executed. After execution of the process in S42 or S43, the browser 41 proceeds to S18.

Figure 2:
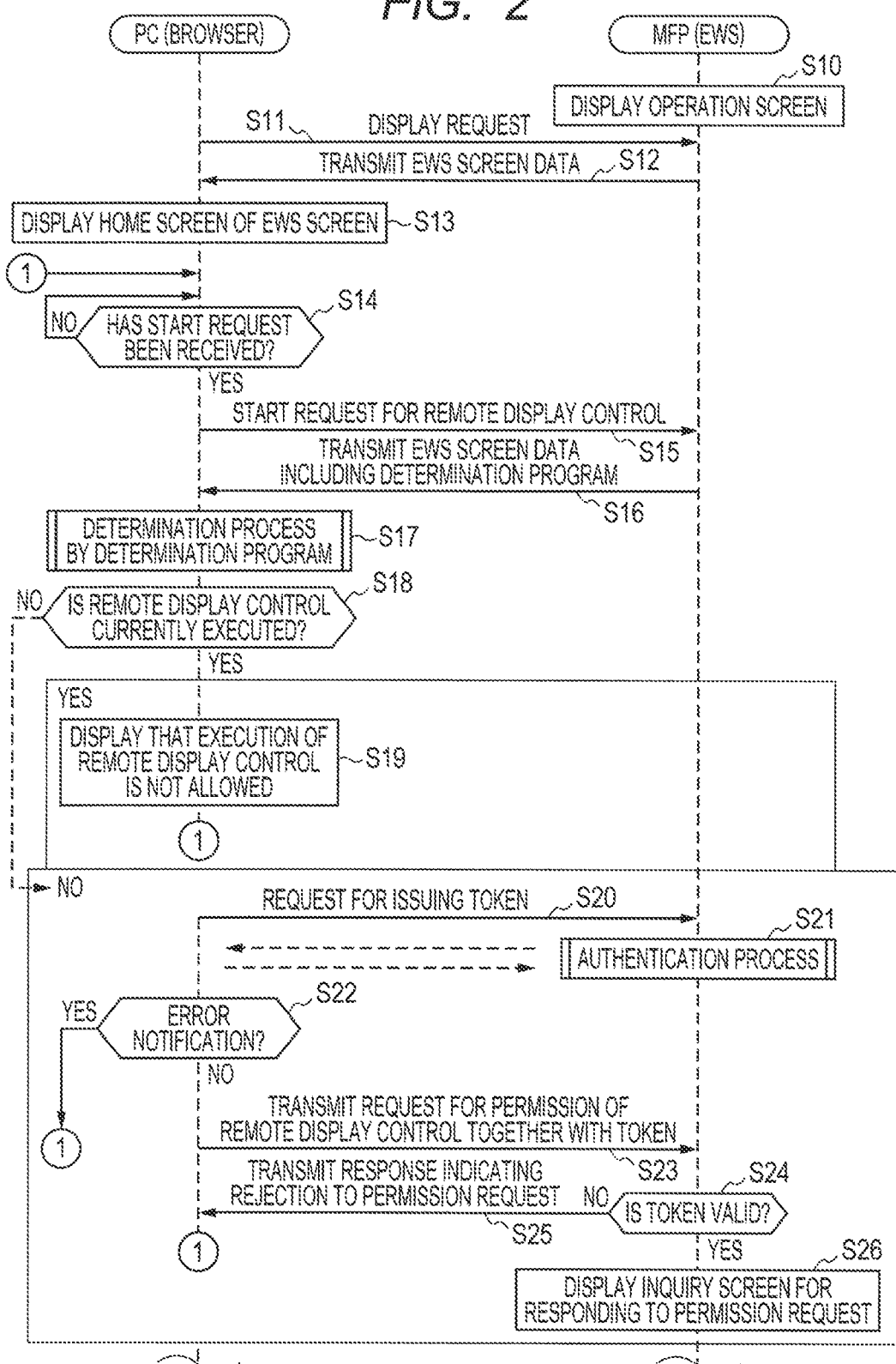
FIG. 2 is a part of a timing chart for explaining processing when starting remote display control.
Figure 3:
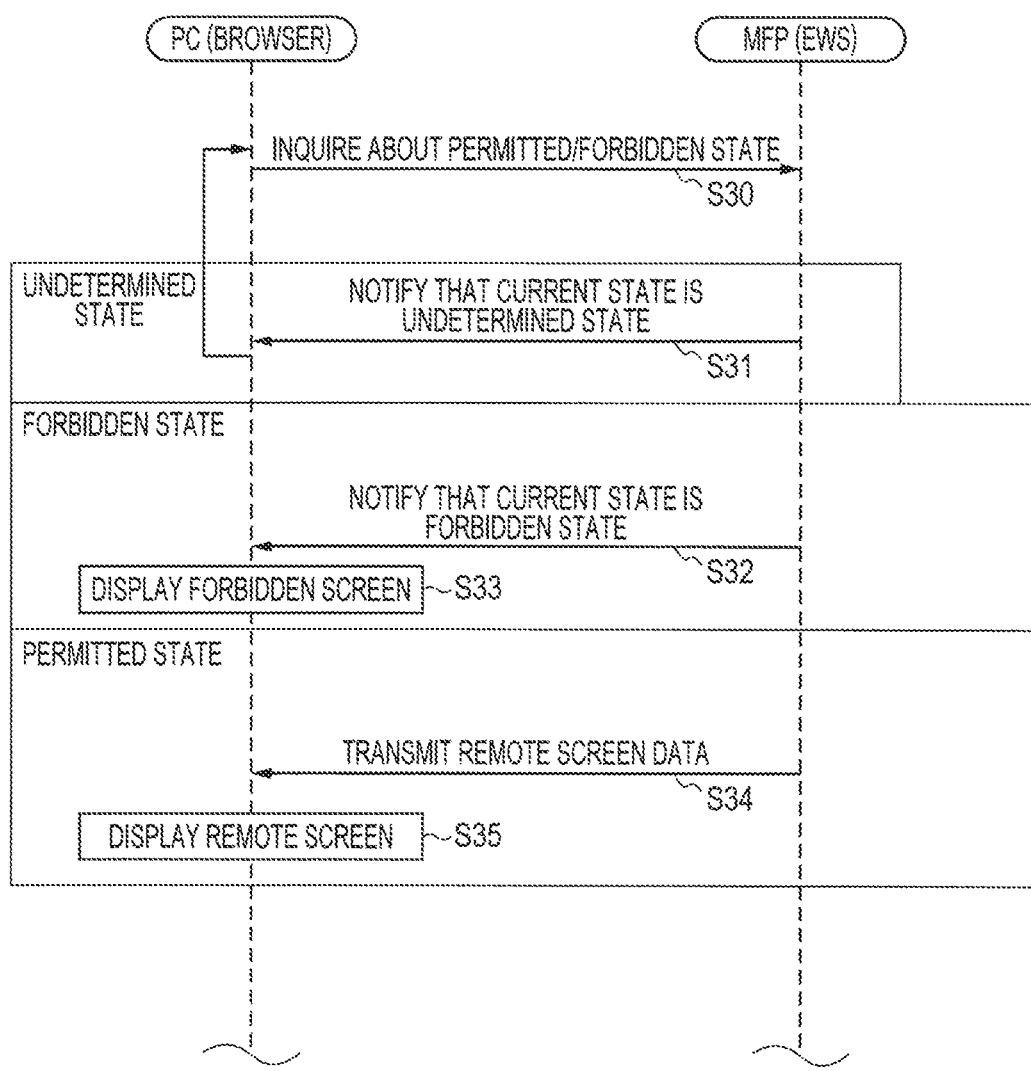
FIG. 3 is another part of the timing chart for explaining the processing when starting the remote display control.

In S18 in FIG. 2, the browser 41 determines whether remote display control for another apparatus is currently executed based on the value of the execution state determination flag. If a positive determination is made in S18, the browser 41 proceeds to S19.

Figure 6:
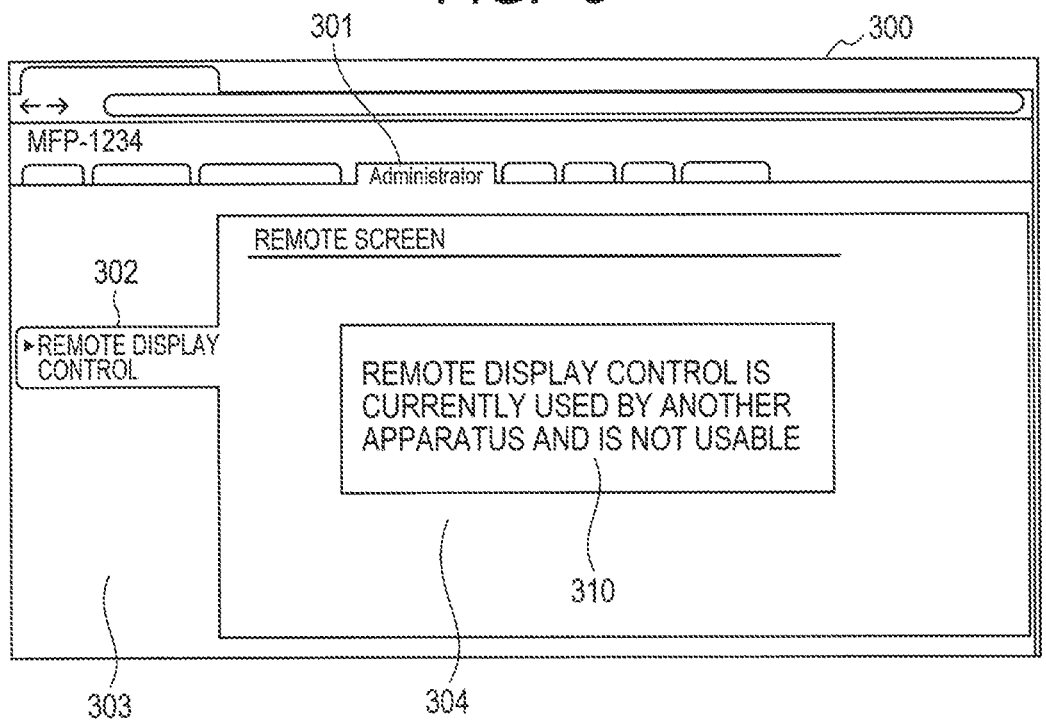
FIG. 6 is a diagram for illustrating a screen displayed on a PC when the remote display control is not permitted.

In S19, the display 34 displays a screen indicating that execution of remote display control for the PC 30 (the apparatus operated by the user) is not possible. More specifically, as shown in FIG. 6, a text image 310 is displayed in the function display area 304 of the EWS screen 300 indicating that remote display control for another apparatus is currently executed and execution of remote display control for this apparatus is not possible. For example, the text image 310 is included in the EWS screen data. In the present embodiment, the EWS screen 300 displayed on the display 34 in response to execution of the process in S19 by the browser 41 is an example of a second screen. When the process in S19 is finished, the browser 41 returns to S14 and continues to display the home screen of the EWS screen. If the user performs an operation for selecting remote display control, a positive determination is made in S14 and the process in S15 and the subsequent processes are performed again.

If the browser 41 makes a negative determination in S18 based on the value of the execution state determination flag, the browser 41 proceeds to S20. In S20, the browser 41 requests the EWS 20 to issue a token.

Figure 7:
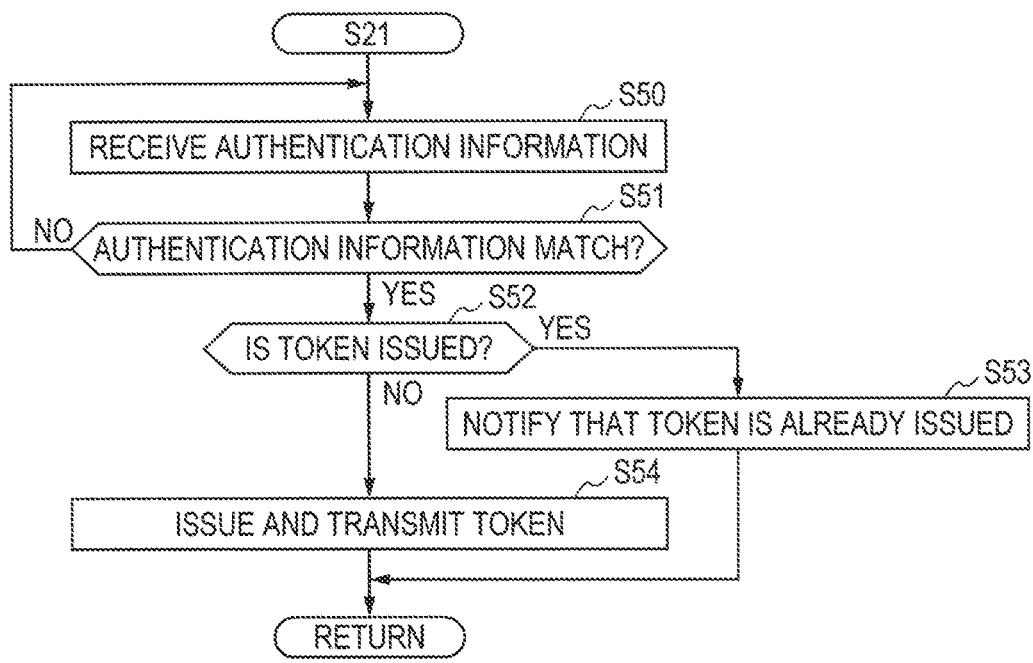
FIG. 7 is a flowchart for explaining a procedure of processing executed in S21 of FIG. 2.
Figure 8:
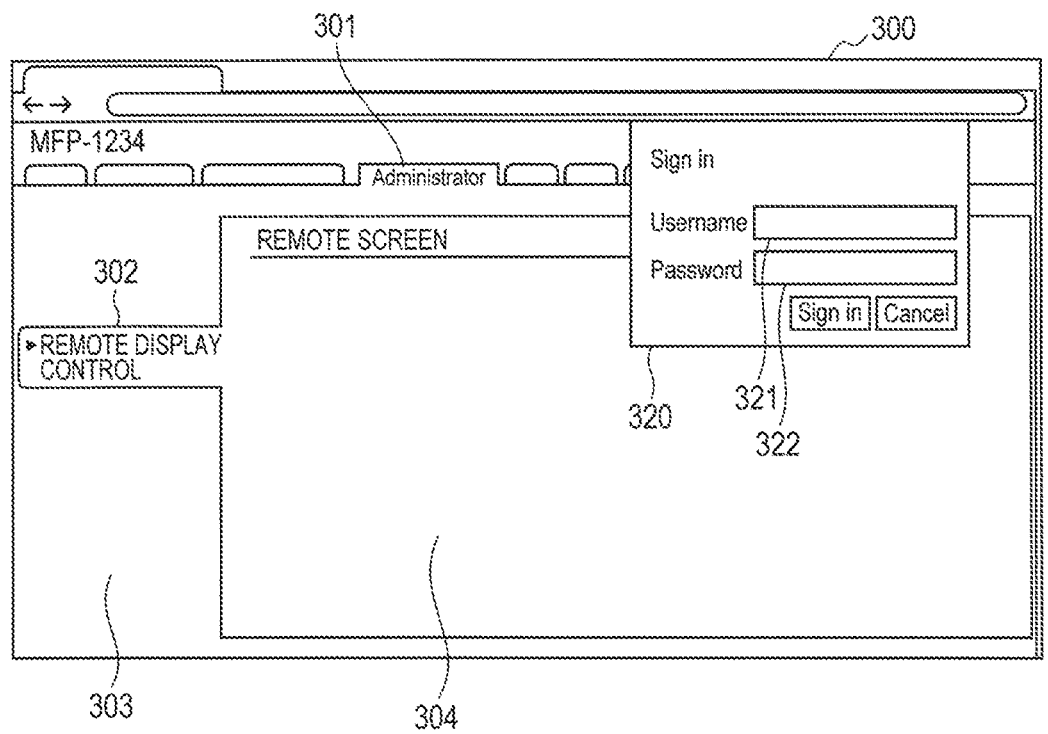
FIG. 8 is a diagram for illustrating a screen displayed on the PC.

In response to receiving the request to issue a token from the PC 30, the EWS 20 of the MFP 10 performs an authentication process in S21. FIG. 7 shows a detailed procedure for the authentication process performed in S21. The EWS 20 receives authentication information from the browser 41 in S50. More specifically, the EWS 20 transmits data to the browser 41 for displaying a login form 320 for input of authentication information shown in FIG. 8. Based on the transmitted data, the browser 41 displays the EWS screen 300 shown in FIG. 8 on which the login form 320 is superimposed. The browser 41 transmits authentication information (namely, a user name and a password) input through the login form to the MFP 10. The EWS 20 receives the authentication information.

In S51, the EWS 20 determines whether authentication information transmitted from the browser 41 matches authentication information on a user (for example, an administrator) authorized to execute remote display control and stored in the management information 25 in the memory 12 of the MFP 10. If both authentication information do not match, a negative determination is made in S51 and the processing returns to S50. If both authentication information match, a positive determination is made in S51 and the processing proceeds to S52.

In S52, the EWS 20 determines whether a token is already issued. A token is information for authorizing the PC 30, and in the present embodiment, is a one-time token generated based on the authentication information. If information indicating that a token is already issued is stored in the memory 12, the EWS 20 determines that a token is already issued. If a token is not issued yet (S52: NO), a token is issued based on the authentication information, the issued token is transmitted to the PC 30, and information indicating that the token is already issued is stored into the memory 12 in S54. If a token is already issued (S52: YES), the PC 30 is notified of an error (notified that a token is already issued) (S53) and the process in S21 is finished. The information indicating that the token is already issued stored in S54 is deleted from the memory 12 at the time of end of remote display control. In the present embodiment, a token is an example of an access ID.

Referring back to FIG. 2, in S22, the browser 41 determines whether an error notification resulting from the issuance of the token has been received from the EWS 20. A positive determination made in S22 means that the error has occurred in response to the start request for remote display control. Thus, the processing returns to S14 to continue display of the home screen.

If a negative determination is made in S22, the browser 41 transmits a request for permission of execution of remote display control together with the issued token in S23. In response to receipt of the request for permission of execution of remote display control from the browser 41, the EWS 20 determines in S24 whether the token transmitted together with the permission request is valid. More specifically, if too much time has elapsed since the issuance of the token or if the token is a falsified token, for example, the EWS 20 determines that the token is invalid. In response to determining that the transmitted token is invalid, in S25 the EWS 20 transmits a response to the browser 41 indicating rejection to the permission request. If the rejection response is received from the EWS 20, the browser 41 returns to S14. For example, the browser 41 may return to S14 after displaying an indication on the display 34 indicating that remote display control for this apparatus is not possible.

Figure 9:
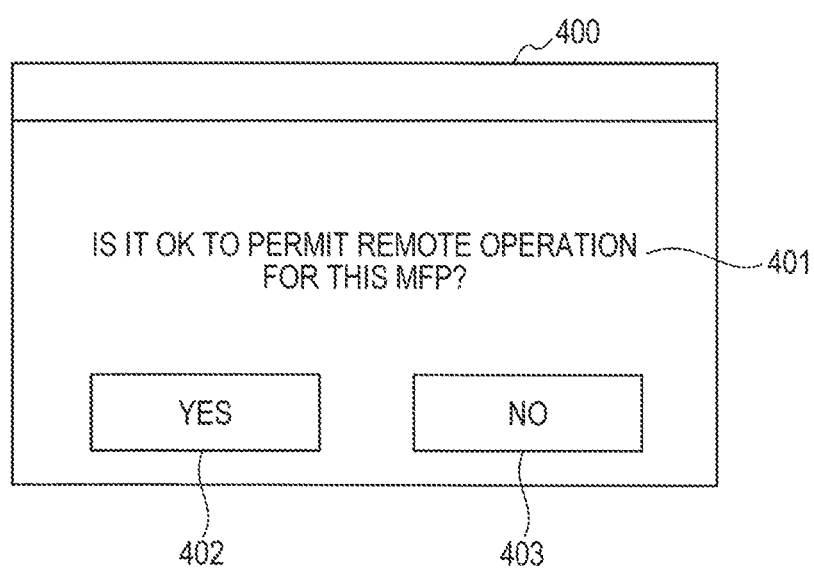
FIG. 9 is a diagram for illustrating a screen displayed on a user interface of an MFP.

In response to determining that the token transmitted from the PC 30 is valid, the EWS 20 makes a positive determination in S24 and proceeds to S26. In S26 the EWS 20 causes the user interface 17 to display an inquiry screen 400 shown in FIG. 9. The inquiry screen 400 includes a text image 401 indicating that a request for permission of execution of remote display control has been made from the PC 30, and an icon 402 and an icon 403. In response to receiving an operation on the icon 402 on the inquiry screen 400 through the user interface 17, the EWS 20 stores information indicating a permitted state in the memory 12. In response to receiving an operation on the icon 403 on the inquiry screen 400 through the user interface 17, the EWS 20 stores information indicating a forbidden state in the memory 12. The EWS 20 deletes the information indicating the permitted state or the forbidden state in the memory 12 when the remote display control ends.

In S30, the browser 41 of the PC 30 sends an inquiry to the EWS 20 about a permitted/forbidden state of remote display control.

If neither information indicating a permitted state nor information indicating a forbidden state is stored in the memory, the EWS 20 notifies the browser 41 of information indicating an undetermined state in S31 in response to the inquiry from the browser 41. In response to receipt of the notified information indicating the undetermined state, the browser 41 of the PC 30 stands by for a particular period of time and then returns to S30 to send an inquiry again to the EWS 20 about the permitted/forbidden state.

Figure 10:
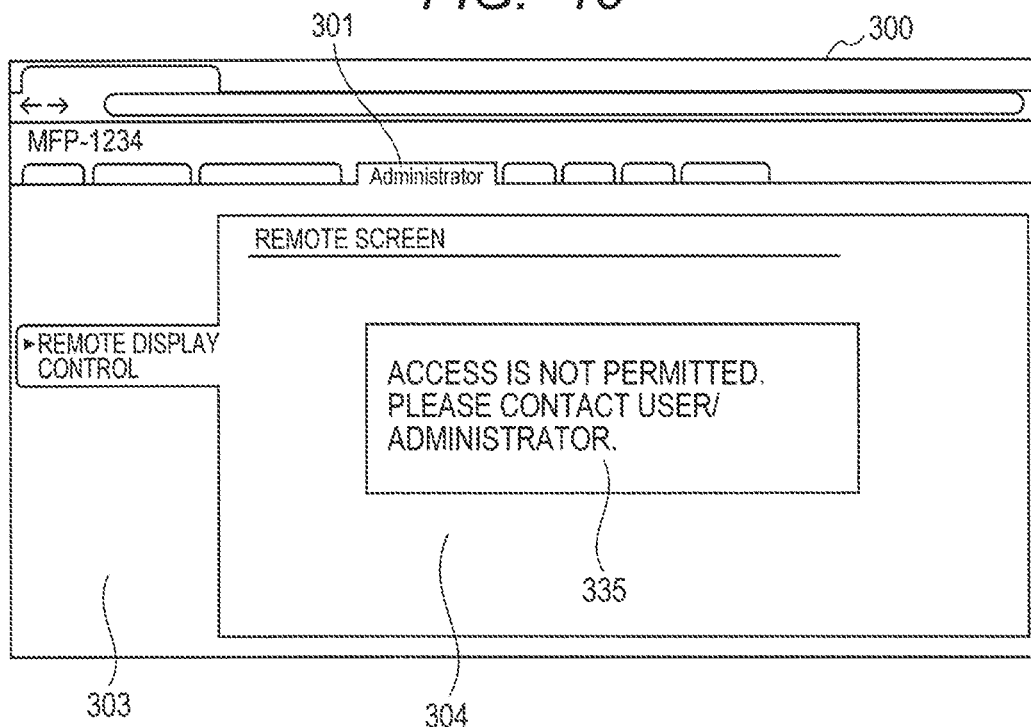
FIG. 10 is a diagram for illustrating a screen displayed on the PC when the remote display control is forbidden by an administrator.

If information indicating a forbidden state is stored in the memory 12, the EWS 20 notifies the browser 41 of information indicating a forbidden state in S32. In response to receiving the notification of the forbidden state, the browser 41 causes the display 34 to display a forbidden screen in S33. As shown in FIG. 10, in S33, the browser 41 superimposes a text image 335 indicating that execution of remote display control has been forbidden by the MFP 10 on the function display area 304 of the EWS screen 300. This allows the user of the PC 30 to determine that the PC 30 is in a status in which remote display control is forbidden by the MFP 10 by seeing the text image 335 displayed on the display 34.

In the present embodiment, a screen displayed by the browser 41 on the display 34 as a result of execution of the process in S33 is an example of a first screen. In the present embodiment, the screen displayed on the display 34 in S33 and the screen displayed on the display 34 in S19 differ from each other. This allows the user of the PC 30 to easily understand the reason why remote display control for the user's apparatus is not possible.

If the information indicating a permitted state is stored in the memory, the EWS 20 transmits remote screen data for causing the browser 41 to display a remote screen to the PC 30 in S34. In the present embodiment, the remote screen data is data including data indicating an operation screen currently displayed on the user interface 17. More specifically, this data includes data indicating operation keys which are physical keys of the user interface 17 and data indicating an end button (a reference sign 333 in FIG. 11) described later, in addition to the data indicating the operation screen. The EWS 20 generates the remote screen data and transmits the generated remote screen data to the browser 41. In S35, the browser 41 causes the execution program to interpret the remote screen data and causes the display 34 to display a remote screen.

The data indicating the operation screen, the data indicating the operation keys, and the data indicating the end button included in the remote screen data may be of the same data format such as a raster data format or may be of other data formats. The data indicating the operation screen, the data indicating the operation keys, and the data indicating the end button may be of data formats different from each other. The EWS 20 may transmit only the data indicating the operation screen to the browser 41 as the remote screen data in S34, and the browser 41 may display a remote screen while superimposing the data indicating the operation keys and the data indicating the end button on the remote screen data by interpreting the execution program in S35. In addition to the foregoing, the EWS 20 may transmit the data indicating the operation screen and the data indicating the operation keys to the browser 41 as the remote screen data in S34, and the browser 41 may superimpose the data indicating the end button on the remote screen data by interpreting the execution program in S35. In the present embodiment, the remote screen data is an example of screen data. Instead of transmitting the remote screen data to the browser 41 in S34, the EWS 20 may transmit, to the browser 41, web page data for displaying the entire EWS screen including the remote screen data.

The browser 41 executes the execution program to request the EWS 20 for remote screen data for displaying a remote screen on a regular basis and to cause the user interface 17 to reflect a currently displayed screen in the remote screen. For example, in response to receiving an operational input on a remote screen 330 through the user interface 35, the browser 41 transmits a request responsive to the received operational input to the EWS 20 by executing the execution program. At this time, the browser 41 transmits the token already issued by the EWS 20 together with the request responsive to the operational input. If the operational input on the remote screen 330 relates to screen update, for example, the browser 41 transmits, to the EWS 20, a request for remote screen data for displaying an updated remote screen together with the token. In response to receiving the request for the remote screen data, the EWS 20 generates remote screen data for displaying the remote screen 330 as updated, and transmits the generated remote screen data to the browser 41 on condition that the token is valid.

As shown in FIG. 11, the remote screen 330 is displayed in the function display area 304 on the EWS screen 300. The remote screen 330 includes a screen display area 331 and an operation key display area 332. A screen displayed in the screen display area 331 is the same as an operation screen currently displayed on the user interface 17 of the MFP 10. In FIG. 11, a standby screen is displayed as an example in the screen display area 331. Icon images imitating operation keys which are physical keys of the user interface 17 are displayed in the operation key display area 332.

A remote screen displayed on the display 34 of the PC 30 is also updated when the user of the MFP 10 operates the user interface 17. In this case, in response to receiving an operation to change a display screen through the user interface 17, the EWS 20 may transmit remote screen data about the remote screen as updated to the browser 41 without waiting for a request from the execution program.

The remote screen 330 includes an end button 333 as an end indicator. The end button 333 is a button for receiving an operation for ending remote display control when the remote display control is executed for the user's apparatus. In response to receiving an operational input on the end button 333 by the user, the browser 41 transmits a request for ending the remote display control to the EWS 20 together with a token. In response to receiving the end request from the PC, the EWS 20 ends the remote display control on condition that the token is valid. By ending the remote display control by the EWS 20, various types of information stored in the memory 12 are deleted such as information indicating an execution state of the remote display control, information indicating that the token is already issued, and information indicating a permitted state of the remote display control. The remote display control may be ended after the EWS 20 deletes these information. Alternatively, these information may be deleted by another program in response to ending the remote display control as a trigger.

If there is no access from the browser 41 to execute the execution program for a certain period of time since start of the remote display control, the EWS 20 ends the remote display control as in the case in which the end button is pressed.

In the embodiment described above, the following effects are obtained.

In a case where any of the plurality of PCs has requested the start of remote display control and it is determined that the remote display control is currently executed by a previous request, the remote display control for the PC that made the start request is not executed. This prevents multiple PCs from executing remote display control for one MFP 10, and prevents adverse effects on the operation of the MFP 10.

When it is determined that the remote display control is currently executed by the previous request, the EWS 20 does not transmit the remote screen data to the PC that made the start request. This suppresses an increase in the processing load and prevents the remote display control for the PC that made the start request from being executed in a situation where the remote display control is currently executed.

When it is determined that the remote display control is currently executed by the previous request, the PC does not request the EWS 20 to transmit the remote screen data. Thus, in a situation where the remote display control is currently executed, the transmission of the remote screen data by the PC is not requested, and thus the increase in the processing load at the EWS 20 side is suppressed.

The browser 41 executes the determination process in response to requesting the EWS 20 to start the remote display control as a trigger. This suppresses an increase in the processing load of the browser 41 of the PC.

The PC executes the determination process by executing the determination program transmitted by the EWS 20. Thus, it is not necessary to install the determination program on the PC in advance, which improves the convenience for the user of the PC.

The EWS 20 transmits the determination program to the PC in a state where the determination program is included in the Web page data. This simplifies the process required for the transmission as compared with the case where the determination program is transmitted separately from the Web page data.

The determination program is transmitted to the browser 41 by utilizing the configuration of transmitting, to the browser 41, the execution program which is a script program for executing the process related to the remote display control. Thus, the determination program for executing the determination process and the execution program for executing the remote display control are transmitted in the same transmission form. This suppresses the complexity of the transmission form of the programs between the PC and the MFP 10.

By operating the end button displayed on the remote screen 330, it is possible to immediately perform remote display control in response to a start request from a new PC. This enhances the convenience of the users who use the image forming system.

<Modifications>

While the disclosure has been described in detail with reference to the above aspects thereof, it would be apparent to those skilled in the art that various changes and modifications may be made therein without departing from the scope of the claims. The disclosure may be implemented in various modes.

In the above-described embodiment, the browser 41 of the PC determines whether remote display control is currently executed by a previous request. Alternatively, the EWS 20 of the MFP 10 may determine whether remote display control is currently executed by a previous request. In this case, in a case where a start request for the remote display control is transmitted from the browser 41 in S15 in FIG. 2, the EWS 20 executes the process of S17 to determine whether the remote display control for a PC other than the PC that has made the start request is currently being executed. In response to determining that the remote display control for the other PC is currently being executed by the process of S17, the EWS 20 transmits, to the PC that has made the start request, a notification that the remote display control for this PC cannot be executed. Further, in a case where the browser 41 makes a start request for the remote display control to the EWS 20 in S15 and the EWS 20 determines that the remote display control for the other PC is currently being executed by the process of S17, the process of transmitting, to the browser 41, the EWS screen data including the determination program of S16 may not be executed. That is, in this modification, the EWS 20 functions as a determination controller.

In the above-described embodiment, in S16 the EWS 20 of the MFP 10 transmits the determination program to the browser 41 by the script program included in the EWS screen data. Alternatively, the EWS 20 may transmit the determination program to the browser 41 separately from the EWS screen data. In this case, the EWS 20 may transmit the determination program in S16 separately from the EWS screen data after the start request is transmitted from the browser 41 in S15 of FIG. 2, In the above-described embodiment, the browser 41 executes the process of S35 by executing the execution program included in the remote screen data. Alternatively, the browser 41 may execute the processes from S18 to S35 by executing the execution program. Further, the browser 41 may execute the processes from S13 to S35 except S17 by executing the execution program.

In the above-described embodiment, the browser 41 of the PC executes the determination process by executing the determination program included in the EWS screen data which is the Web page data. Alternatively, the browser 41 may have a function of performing the determination process in advance. In this case, too, in S15, the browser 41 transmits a start request for the remote display control to the EWS 20, and inquires the EWS 20 about information indicating the current execution state in the remote display control. Further, the EWS 20 may transmit the EWS screen data not including the execution program to the browser 41 in S16 of FIG. 2.

In the above-described embodiment, the MFP 10 has been described as an example of the image forming apparatus, but the image forming apparatus may be a printer, a scanner, or a copier. Further, the PC has been described as an example of the information processing apparatus, but the information processing apparatus may be a mobile terminal such as a smartphone.

In the above-described embodiment, in response to transmitting a start request for the remote display control to the EWS 20, the browser 41 determines whether the remote display control is currently executed by the previous request. Alternatively, the browser 41 may determine whether the remote display control is currently executed prior to the start request for the remote display control. Specifically, the browser 41 may receive the determination program together with the EWS screen data in S12 of FIG. 2. In this case, the browser 41 need not receive the determination program in S16. The browser 41 may execute S17 at any timing after S12 and before S18. Further, the browser 41 may skip S13 and S14, that is, may skip display of the home screen of the EWS screen.

What is claimed is:

1. An image forming system comprising an image forming apparatus and a plurality of information processing apparatuses,
    a first controller of the image forming apparatus being configured to execute a remote display control, the remote display control being control of, in response to receiving a start request from one of the plurality of information processing apparatuses, controlling a requesting information processing apparatus to display a remote screen, the requesting information processing apparatus being the one of the plurality of information processing apparatuses that has transmitted the start request, the remote screen being a screen corresponding to an operation screen displayed on a user interface of the image forming apparatus,
    the requesting information processing apparatus including a second controller, the second controller being configured to display the remote screen in accordance with the remote display control by the first controller,
    the first controller or the second controller serving as a determination controller,
    the determination controller being configured to determine whether the remote display control is currently executed by a previous request in response to receiving the start request from the requesting information processing apparatus, the previous request being a request transmitted from another one of the plurality of information processing apparatuses, the previous request being a request for the remote display control to the image forming apparatus, the previous request being a request transmitted before the start request is transmitted by the requesting information processing apparatus,
    the second controller being configured to:
        in response to determining that the remote display control is not currently executed by the previous request, request the image forming apparatus to issue an access ID; and
        transmit the start request together with the access ID issued by the first controller,
    the first controller being configured to:
        in response to determining that the remote display control is not currently executed by the previous request and that authentication of the requesting information processing apparatus is successful based on the access ID, execute the remote display control for the requesting information processing apparatus; and
        in response to determining that the remote display control is currently executed by the previous request, not execute the remote display control for the requesting information processing apparatus.

2. The image forming system according to claim 1, wherein the first controller is configured to:
    when executing the remote display control, create screen data for displaying the remote screen on a browser of the requesting information processing apparatus, and transmit the created screen data to the requesting information processing apparatus; and
    in response to determining that the remote display control is currently executed by the previous request, not transmit the screen data to the requesting information processing apparatus, thereby not executing the remote display control for the requesting information processing apparatus.

3. The image forming system according to claim 2, wherein, in response to a request from the requesting information processing apparatus, the first controller is configured to transmit the screen data to the requesting information processing apparatus; and
    wherein, in response to determining that the remote display control is currently executed by the previous request, the second controller is configured not to request the first controller to transmit the screen data.

4. The image forming system according to claim 1, wherein the determination controller is configured to, in response to transmission of the start request from the requesting information processing apparatus to the image forming apparatus, determine whether the remote display control is currently executed by the previous request.

5. The image forming system according to claim 1, wherein the determination controller is configured to:
transmit an inquiry to the first controller about whether the remote display control is currently executed; and
based on a response from the first controller regarding the inquiry, determine whether the remote display control is currently executed by the previous request.

6. The image forming system according to claim 1, wherein, in response to determining that the remote display control is currently executed by the previous request, the first controller is configured not to issue the access ID to the requesting information processing apparatus.

7. The image forming system according to claim 6, wherein the first controller is configured to transmit a determination program to the requesting information processing apparatus; and
wherein the second controller is configured to execute the determination program transmitted by the first controller, thereby serving as the determination controller.

8. The image forming system according to claim 7, wherein the first controller is configured to:
create Web page data for display on a browser of the requesting information processing apparatus; and
transmit the Web page data to the browser, the Web page data including the determination program; and
wherein the second controller is configured to interpret the determination program by using the browser, thereby serving as the determination controller.

9. The image forming system according to claim 8, wherein the first controller is configured to transmit, to the requesting information processing apparatus, an execution program for causing the second controller to execute processing relating to the remote display control; and
wherein the second controller is configured to:
by executing the execution program transmitted by the first controller, receive, from the image forming apparatus, screen data for displaying the remote screen on the browser of the requesting information processing apparatus; and
display the remote screen on the browser of the requesting information processing apparatus.

10. The image forming system according to claim 1, wherein the remote screen includes an end indicator;
wherein the second controller is configured to, in response to receiving an operation input to the end indicator during execution of the remote display control, transmit an end request for the remote display control to the image forming apparatus;
wherein the first controller is configured to, in response to receiving the end request, end the remote display control; and
wherein the determination controller is configured to:
determine that the remote display control is currently executed until the end indicator is operated and the remote display control ends; and
determine that the remote display control is not currently executed after the end indicator is operated and the remote display control ends.

11. An image forming system comprising an image forming apparatus and a plurality of information processing apparatuses,
a first controller of the image forming apparatus being configured to execute a remote display control, the remote display control being control of, in response to receiving a start request from one of the plurality of information processing apparatuses, controlling a requesting information processing apparatus to display a remote screen, the requesting information processing apparatus being the one of the plurality of information processing apparatuses that has transmitted the start request, the remote screen being a screen corresponding to an operation screen displayed on a user interface of the image forming apparatus,
the requesting information processing apparatus including a second controller, the second controller being configured to display the remote screen in accordance with the remote display control by the first controller,
the first controller or the second controller serving as a determination controller,
the determination controller being configured to determine whether the remote display control is currently executed by a previous request in response to receiving the start request from the requesting information processing apparatus, the previous request being a request transmitted from another one of the plurality of information processing apparatuses, the previous request being a request for the remote display control to the image forming apparatus, the previous request being a request transmitted before the start request is transmitted by the requesting information processing apparatus,
the first controller being configured to:
in response to receiving the start request, receive an operation of forbidding execution of the remote display control through the user interface;
in response to determining that the remote display control is not currently executed by the previous request and receiving the operation of forbidding the execution of the remote display control, control the requesting information processing apparatus to display a first screen, the first screen being a screen for notifying that the remote display control is not to be executed;
in response to determining that the remote display control is not currently executed by the previous request and not receiving the operation of forbidding the execution of the remote display control, execute the remote display control for the requesting information processing apparatus; and
in response to determining that the remote display control is currently executed by the previous request, control the requesting information processing apparatus to display a second screen and not execute the remote display control for the requesting information processing apparatus, the second screen being a screen different from the first screen, the second screen being a screen for notifying that the remote display control is not to be executed.

12. The image forming system according to claim 11, wherein the first screen indicates that an access to the image forming apparatus is not permitted; and
wherein the second screen indicates that the remote display control is currently used by another information processing apparatus and is not usable.

13. An image forming apparatus comprising:
a user interface; and
a controller configured to:
in response to receiving a start request for a remote display control from one of a plurality of information processing apparatuses, determine whether the remote display control is currently executed by a previous request, the remote display control being control of controlling a requesting information processing apparatus to display a remote screen, the requesting information processing apparatus being the one of the plurality of information processing apparatuses that has transmitted the start request, the remote screen being a screen corresponding to an operation screen displayed on the user interface, the previous request being a request transmitted from another one of the plurality of information processing apparatuses, the previous request being a request for the remote display control to the image forming apparatus, the previous request being a request transmitted before the start request is transmitted by the requesting information processing apparatus;

in response to receiving the start request, receive an operation of forbidding execution of the remote display control through the user interface;

in response to determining that the remote display control is not currently executed by the previous request and receiving the operation of forbidding the execution of the remote display control, control the requesting information processing apparatus to display a first screen, the first screen being a screen for notifying that the remote display control is not to be executed;

in response to determining that the remote display control is not currently executed by the previous request and not receiving the operation of forbidding the execution of the remote display control, execute the remote display control for the requesting information processing apparatus; and in response to determining that the remote display control is currently executed by the previous request, control the requesting information processing apparatus to display a second screen and not execute the remote display control for the requesting information processing apparatus, the second screen being a screen different from the first screen, the second screen being a screen for notifying that the remote display control is not to be executed.

14. The image forming apparatus according to claim 13, wherein the controller is configured to:

when executing the remote display control, create screen data for displaying the remote screen on a browser of the requesting information processing apparatus, and transmit the created screen data to the requesting information processing apparatus; and in response to determining that the remote display control is currently executed by the previous request, not transmit the screen data to the requesting information processing apparatus, thereby not executing the remote display control for the requesting information processing apparatus.

15. An image forming system comprising an image forming apparatus and a plurality of information processing apparatuses, the image forming apparatus including a user interface, each of the plurality of information processing apparatuses including a browser, a first controller of the image forming apparatus being configured to:

control the user interface to display a first operation screen;

switch the first operation screen in accordance with an operation via the first operation screen;

execute an image forming process in accordance with an operation via the first operation screen; and switch the first operation screen in accordance with an operating state of the image forming apparatus, the first controller being configured to:

execute a remote display control, the remote display control being control of, in response to receiving a start request from one of the plurality of information processing apparatuses, controlling a requesting information processing apparatus, by transmitting remote screen data, to display a second operation screen on the browser of the requesting information processing apparatus, the second operation screen being an operation screen corresponding to the first operation screen displayed on the user interface of the image forming apparatus, the requesting information processing apparatus being the one of the plurality of information processing apparatuses that has transmitted the start request, the remote screen data being screen data based on the first operation screen displayed on the user interface of the image forming apparatus, the first controller being configured to, during execution of the remote display control:

transmit the remote screen data to the requesting information processing apparatus in accordance with an operation via the second operation screen, the remote screen data being for switching the second operation screen;

execute the image forming process in accordance with an operation via the second operation screen; and transmit the remote screen data to the requesting information processing apparatus in accordance with the operating state of the image forming apparatus, the remote screen data being for switching the second operation screen, the requesting information processing apparatus including a second controller, the second controller being configured to display the second operation screen on the browser in accordance with the remote display control by the first controller, the first controller or the second controller serving as a determination controller, the determination controller being configured to determine whether the remote display control is currently executed by a previous request in response to receiving the start request from the requesting information processing apparatus, the previous request being a request transmitted from another one of the plurality of information processing apparatuses, the previous request being a request for the remote display control to the image forming apparatus, the previous request being a request transmitted before the start request is transmitted by the requesting information processing apparatus, the first controller being configured to:

in response to determining that the remote display control is not currently executed by the previous request, execute the remote display control for the requesting information processing apparatus; and in response to determining that the remote display control is currently executed by the previous request, not execute the remote display control for the requesting information processing apparatus.

16. The image forming system according to claim 15, wherein the remote screen data transmitted by the image forming apparatus further includes data for displaying an end object on the browser;

wherein the first controller is configured to:
  in response to receiving an operation via the end object displayed on the browser, end the remote display control; and
wherein the determination controller is configured to:
  after ending the remote display control, in response to receiving another start request for the remote display control, determine that the remote display control is not currently executed.

17. An image forming apparatus comprising:
a user interface; and
a controller configured to:
  control the user interface to display a first operation screen;
  switch the first operation screen in accordance with an operation via the first operation screen;
  execute an image forming process in accordance with an operation via the first operation screen; and
  switch the first operation screen in accordance with an operating state of the image forming apparatus,
the controller being configured to:
  execute a remote display control, the remote display control being control of, in response to receiving a start request from one of a plurality of information processing apparatuses, controlling a requesting information processing apparatus, by transmitting remote screen data, to display a second operation screen on a browser of the requesting information processing apparatus, the second operation screen being an operation screen corresponding to the first operation screen displayed on the user interface, the requesting information processing apparatus being the one of the plurality of information processing apparatuses that has transmitted the start request, the remote screen data being screen data based on the first operation screen displayed on the user interface,
the controller being configured to, during execution of the remote display control:
  transmit the remote screen data to the requesting information processing apparatus in accordance with an operation via the second operation screen, the remote screen data being for switching the second operation screen;
  execute the image forming process in accordance with an operation via the second operation screen; and
  transmit the remote screen data to the requesting information processing apparatus in accordance with the operating state of the image forming apparatus, the remote screen data being for switching the second operation screen,
the controller being configured to:
  in response to receiving the start request for the remote display control from the requesting information processing apparatuses, determine whether the remote display control is currently executed by a previous request, the previous request being a request transmitted from another one of the plurality of information processing apparatuses, the previous request being a request for the remote display control to the image forming apparatus, the previous request being a request transmitted before the start request is transmitted by the requesting information processing apparatus;
  in response to determining that the remote display control is not currently executed by the previous request, execute the remote display control for the requesting information processing apparatus; and
  in response to determining that the remote display control is currently executed by the previous request, not execute the remote display control for the requesting information processing apparatus.

18. The image forming apparatus according to claim 17, wherein the remote screen data transmitted by the controller further includes data for displaying an end object on the browser of the requesting information processing apparatus; and
  wherein the controller is configured to:
    in response to receiving an operation via the end object displayed on the browser of the requesting information processing apparatus, end the remote display control; and
    after ending the remote display control, in response to receiving another start request for the remote display control, determine that the remote display control is not currently executed.

* * * * *